(No Model.) 3 Sheets—Sheet 1.
T. HARPER.
CONVERTER SYSTEM FOR ELECTRIC RAILWAYS.
No. 544,037. Patented Aug. 6, 1895.
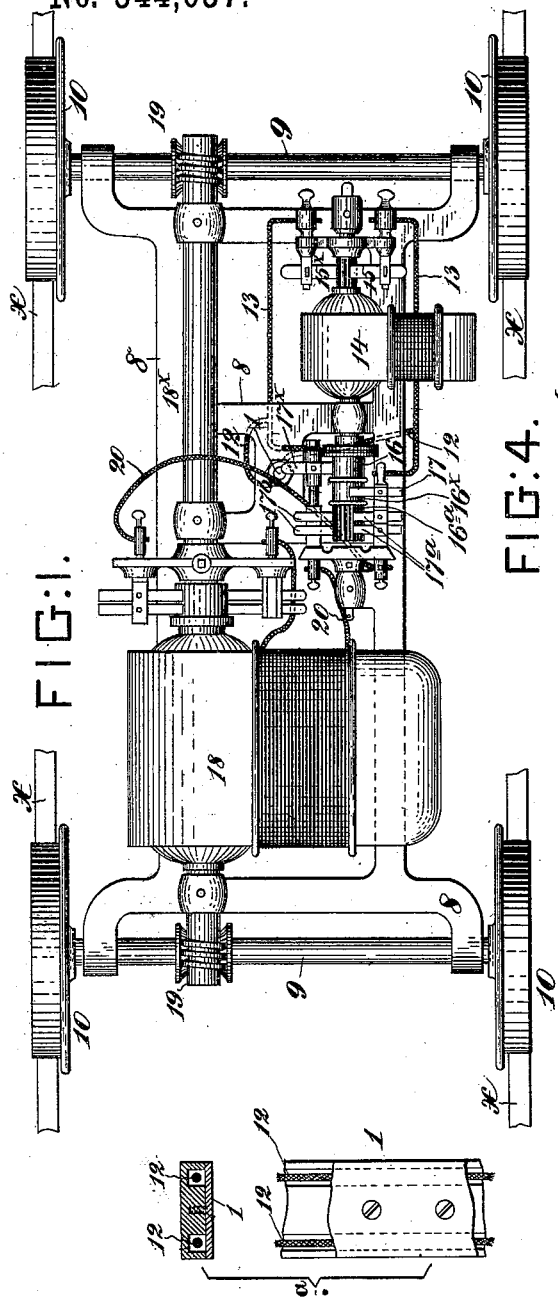
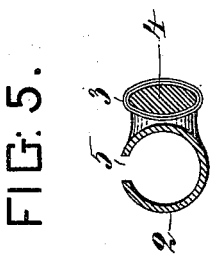
Witnesses:
Inventor:
Thomas Harper
by Henry Connett
his Attorney (No Model.) 3 Sheets—Sheet 2.
T. HARPER.
CONVERTER SYSTEM FOR ELECTRIC RAILWAYS.
No. 544,037. Patented Aug. 6, 1895.
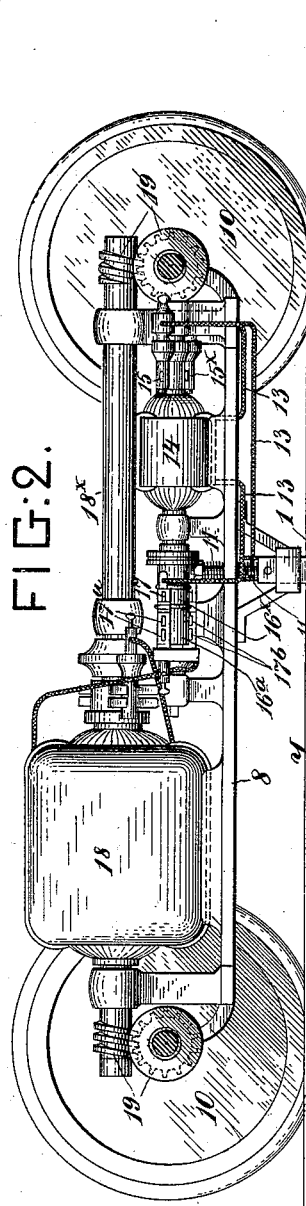
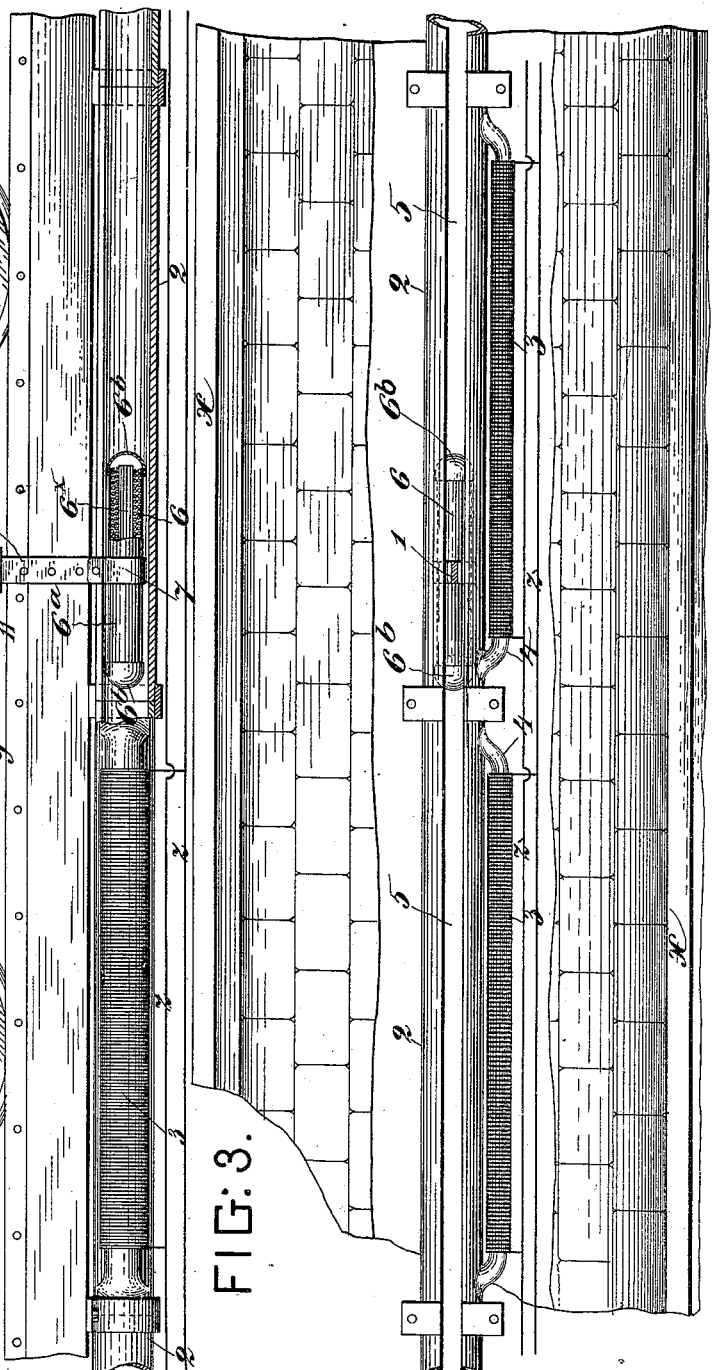
Witnesses:
Inventor:
Thomas Harper
by Henry Connett
his Attorney

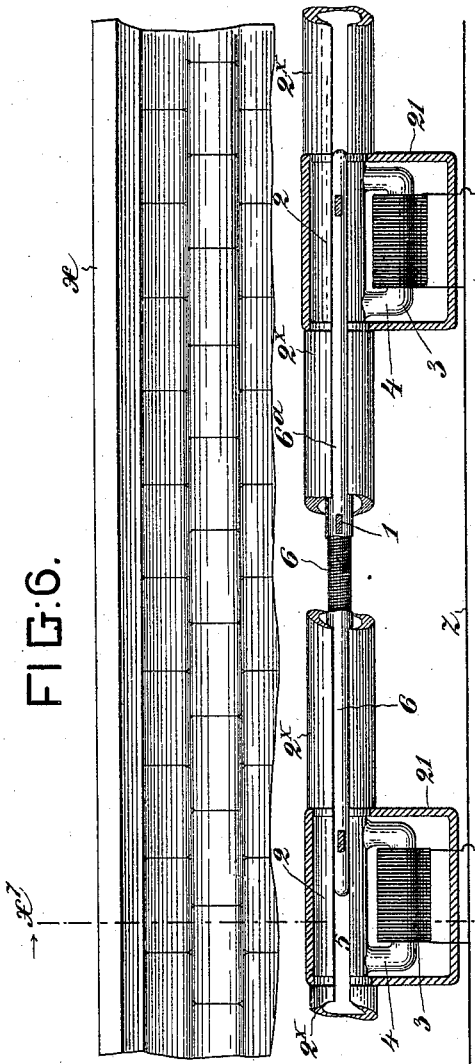

UNITED STATES PATENT OFFICE.

THOMAS HARPER, OF NEW BRUNSWICK, NEW JERSEY.

CONVERTER SYSTEM FOR ELECTRIC RAILWAYS.

SPECIFICATION forming part of Letters Patent No. 544,037, dated August 6, 1895.

Application filed June 29, 1894. Serial No. 516,085. (No model.)

*To all whom it may concern:*

Be it known that I, THOMAS HARPER, a citizen of the United States, residing at New Brunswick, Middlesex county, New Jersey, have invented certain new and useful Improvements in Electric Railways, of which the following is a specification.

My invention relates to the class of devices employed for propelling cars by electricity, wherein induced secondary currents are utilized for driving the car-motor; and the object of the invention is in part to improve the primary coils or transformers and their cores and the secondary coils, whereby permanently and always closed solid magnetic circuits may be utilized, the axes of the primary coils being parallel with the track.

Other features of the invention relate to mechanical construction, and these will be hereinafter fully described, and the novel features of the invention carefully defined in the claims.

In the propulsion of cars it is desirable to utilize a primary alternating-current generator, and to employ on the car a constant-current motor for propulsion, and my construction permits of this. It is also desirable to employ permanently-closed magnetic circuits at the transformers and to avoid chafing contact of the secondary coils with the magnets, and my invention permits of this.

In the accompanying drawings I have illustrated an embodiment of my invention.

Figure 1 is a plan of the truck or running-gear of a car provided with that part of the invention carried by the car. Fig. 1$^a$ is an enlarged detail view of the arm carrying the secondary coil. Fig. 2 is a side elevation of the said truck of the car, the trackway and part of the conduit being in vertical longitudinal section. Fig. 3 is a plan of a portion of the trackway with the conduit exposed to show the transformers and conductors. Fig. 4 is a perspective view showing the conduit and secondary coil in transverse section. Fig. 5 is a transverse section of the conduit and transformer, the conduit forming the always-closed magnetic circuit. Fig. 6 is a plan view of a slightly-different arrangement of the transformers and secondary coil; and Fig. 7 is a transverse section of the same on line $x^7$ in Fig. 6. Fig. 8 is a cross-section illustrating another slightly-modified construction, which will be hereinafter described.

I will first describe the construction illustrated in Figs. 1 to 5, inclusive.

Constructed in the roadway between the track-rails $x$ is a slot $y$ leading down to a conduit below. A pendent arm 1 from the car-truck extends down through the slot $y$ to the conduit, and plays along said slot as the car moves. The conduit 2 is made of iron and forms part of the core of the transformer, the primary coils 3 of the latter being wound upon core-bars 4, integral with the conduit and parallel therewith. The conduit and core form the closed magnetic circuit. Thus the axes of the primary coils are parallel with the bore of the conduit, and the magnetic circuit is permanently closed.

The conduit 2 has in it a longitudinally-extending slot 5, and the arm 1 extends down into the conduit through this slot and is secured to a secondary coil 6. The axis of the secondary coil is parallel with that of the conduit and the primary coil and lengthwise of the track. The coil 6 is secured to the arm 1 by means of a band 7, which embraces the coil about its middle, as shown in Fig. 2. This construction permits the coil to be removed for repair or replacement. The core $6^x$ of the coil 6 is composed of a bundle of fine iron wires, and the wire forming the coil will be wound open or stranded, so as to give the coil flexibility, and thus allow it to pass freely about curves in the track. The coil is inclosed within a flexible insulating cover or jacket $6^a$, and it will be provided with suitable protecting-caps or end pieces $6^b$.

The wires of the primary coils are in circuit with a generator producing alternating currents and represented diagrammatically in Fig. 2 at G. The main conductors are seen at $z$ $z$.

As the car moves along the track the secondary coil is moved along the conduit in the magnetic circuit of the transformer in the direction of the coil-axes and without other than accidental or incidental contact of the moving with the stationary parts.

I will now describe the construction whereby the alternating current induced in the secondary coil 6 is taken to the car, commuted into a constant current, and utilized to run the car-motor.

Referring especially to Figs. 1 and 2 for illustration, 8 is the truck-frame of the car, mounted at its ends on the axles 9, on which are fixed the usual flanged car-wheels 10. The arm 1 is connected to and guided in the truck-frame 8, and in order to allow of some longitudinal play of the arm with respect to the truck-frame the reduced upper end of the arm extends up through an aperture in a transverse bar of the frame and has springs 11 on it, one above and one below the bar. These springs cushion the frame and allow it to play up and down to a limited extent with respect to the arm. A bracket on the frame guides and braces the arm below. This mode of avoiding a rigid connection between the arm and the truck-frame will serve, but it is susceptible of modification in many ways, and I do not limit myself to it. The terminal conductors or wires 12 from the coil 6 are carried up to the car-truck, and this will be done preferably by supporting them on the arm 1. They will be protected against injury in some manner, as by inclosing them in the arm; but as the manner of doing this is not essential to my invention I have illustrated this feature somewhat diagrammatically in Fig. 2. Fig. 1$^a$, however, shows in detail, on a large scale, a construction of the arm 1, which will serve. Longitudinal grooves are formed in the face of the arm, and these are covered by a plate.

A shunt-circuit 13 leads from one wire 12 in series about the field-magnet of a small series-wound motor 14 on the truck, thence to a commutator-brush 15 of said motor, thence through the armature-coils of the motor and back to the brush 15$^x$, and thence to the other wire 12. The armature-shaft of the motor 14 is mounted in bearings on the frame 8. On it, but insulated therefrom, is a rectifying-commutator composed of parts 16, 16$^x$, and 16$^a$. The part 16$^a$ is made up of sections insulated from each other. The part 16 is connected with alternate sections of the part 16$^a$, and the part 16$^x$ is connected with the other sections. On the commutator parts 16 and 16$^x$ bear, respectively, brushes 17$^x$ and 17, and on the part 16$^a$ bear brushes 17$^a$ and 17$^b$. The wires 12 lead to the brushes 17 and 17$^x$.

18 is a constant-current motor mounted on the frame 8 and adapted for driving the car. It may be either a series, shunt, or compound wound type. Its armature-shaft 18$^x$ has bearings on the frame 8 and gears at 19 with the axles 9 of the truck. The brushes 17$^a$ and 17$^b$ are connected with the constant-current wires 20, leading to the motor 18. The circuit connections are clearly shown in Fig. 1 and will be familiar to any electrician.

It will be seen, then, that the alternating induced current set up in the coil 6 flows to the alternating-current motor 14 through a shunt-circuit, while the main current flows through a rectifying-commutator driven by the motor 14 to the large constant-current motor 18, which drives the car.

I have shown the motor constructions in Figs. 1 and 2 somewhat diagrammatically, as these constructions are all well known to those skilled in the art.

I have shown in Figs. 6, 7, and 8 some variations in the construction and arrangement of the parts connected with the track or roadway. Fig. 6 is a plan of one form, and Fig. 7 is a cross-section thereof in the plane indicated by line $x^7$ in Fig. 6. In this construction the transformers do not extend as a continuous conduit, but are in short lengths placed in boxes 21 set in the ground at regular intervals, the iron conduit-sections 2 being joined by conduit-sections 2$^x$, of wood, composition, or any suitable material, but preferably of non-magnetic material. The secondary coil 6 is in this case made quite flexible, as before described, and must be of sufficient length to reach from one transformer to the other, and so that the proper number of windings of the coil 6 will be always in the magnetic field induced by the primary coils. The box 21 may extend up to the level of the street or roadway and have a suitable removable cover 21$^x$, as seen in Fig. 7, to afford access to the transformer.

Fig. 8 is a cross-section illustrating a construction wherein a large continuous conduit 22 extends along the track, and the transformers, similar to those seen in Fig. 6, are mounted therein at intervals. The conduit-sections 2$^x$ are not employed in this construction.

Another feature is the arrangement of the slot 5 in the tubular magnetic circuit at the side, the arm 1 being bent to an L shape for entering and playing along the slot.

It will be understood that with my system the alternating-current motor 14, which rectifies the current driving the motor 18, will run constantly while the car is in service and not be stopped and started when the car stops and starts. I have not shown the usual mechanism employed by the motorman for stopping, starting, and reversing, as these form no part of my invention and are well known to all skilled in the art.

I may place in the shunt-circuit in lieu of the series-wound motor 14 described a single-phase alternating motor of the Tesla type. I do not wish to limit myself in this respect.

Having thus described my invention, I claim—

1. In an electric railway, a transformer coil having a closed magnetic circuit and having a slotted conduit for the secondary coil formed in said circuit with its axis parallel with the axis of the coil.

2. In an electric railway, a transformer comprising a slotted, iron conduit united integrally with the core of the primary coil, and the said coil having its axis parallel with the axis of the conduit.

3. In an electric railway, the combination with a vehicle, an electric motor carried thereon, a secondary coil carried by the vehicle and in circuit with the motor thereon, a stationary slotted iron conduit which provides a way for the secondary coil and forms a part of a closed magnetic circuit, a transformer coil on a core integral with said conduit, and a generator in circuit with said coil.

4. In an electric railway, the combination with a series of transformers, the coils of which are in circuit with a generator, the said transformers arranged at intervals along the railway and having closed magnetic circuits in the form of slotted conduit sections, a movable, flexible, secondary coil in said conduit, the axis of the coil being parallel with the axis of said conduit, a vehicle which carries the secondary coil, and a motor in said vehicle in circuit with said coil.

5. In an electric railway, the combination with a vehicle, a motor thereon, an arm 1, on the vehicle and detachably connected to a secondary coil, the motor on the vehicle being in circuit with said coil, a series of transformers arranged at intervals along the roadway, their coils being in circuit with a generator and their magnetic circuits having in them slotted conduits for the passage of the secondary coil, and the primary generator.

In witness whereof I have hereunto signed my name in the presence of two subscribing witnesses.

THOMAS HARPER.

Witnesses:
 JAMES H. VAN CLEEF,
 RICHARD I. MACDONALD.